(12) United States Patent
Tamura

(10) Patent No.: US 11,704,789 B2
(45) Date of Patent: Jul. 18, 2023

(54) DEFECT INSPECTION DEVICE

(71) Applicant: Kioxia Corporation, Tokyo (JP)

(72) Inventor: Hironobu Tamura, Yokkaichi (JP)

(73) Assignee: Kioxia Corporation, Tokyo (JP)

( * ) Notice: Subject to any disclaimer, the term of this patent is extended or adjusted under 35 U.S.C. 154(b) by 196 days.

(21) Appl. No.: 17/350,597

(22) Filed: Jun. 17, 2021

(65) Prior Publication Data

US 2022/0084176 A1    Mar. 17, 2022

(30) Foreign Application Priority Data

Sep. 11, 2020 (JP) .............................. JP2020-153258

(51) Int. Cl.
*G06T 7/00* (2017.01)
*G06T 3/40* (2006.01)

(52) U.S. Cl.
CPC ................ *G06T 7/001* (2013.01); *G06T 3/40* (2013.01); *G06T 2207/10048* (2013.01); *G06T 2207/10132* (2013.01); *G06T 2207/30148* (2013.01)

(58) Field of Classification Search
CPC .............. G03F 7/7065; G01N 2201/12; G01N 21/9501; G01N 21/956; C08K 5/34926; H04N 5/33; G02B 5/208; G06T 7/001; G06T 3/40; G06T 2207/30148; G06T 2207/10132; G06T 2207/10048
See application file for complete search history.

(56) References Cited

U.S. PATENT DOCUMENTS

| 10,109,538 B2 | 10/2018 | Wimplinger |
| 2019/0178813 A1* | 6/2019 | Kanai ................ G01N 21/9501 |
| 2022/0057369 A1* | 2/2022 | Werner .................. B33Y 50/02 |

FOREIGN PATENT DOCUMENTS

| JP | 10-2291 08 A | 8/1998 |
| JP | 2003-83907 A | 3/2003 |
| JP | 2012-42431 A | 3/2012 |
| JP | 2015-166751 A | 9/2015 |

* cited by examiner

*Primary Examiner* — Phuoc H Doan
(74) *Attorney, Agent, or Firm* — Oblon, McClelland, Maier & Neustadt, L.L.P.

(57) ABSTRACT

A defect inspection device includes an ultrasonic probe, an image acquirer, a calculator, and a corrector. The ultrasonic probe acquires an ultrasonic image of an inspection object or a simulated inspection object. The image acquirer acquires an infrared image including a first region of the simulated inspection object or a second region of the inspection object. The calculator calculates a first correction value for correcting a coordinate deviation of the first region in the ultrasonic image and the infrared image with respect to a designed coordinate of the first region, or calculate a second correction value for correcting a coordinate deviation of the second region in the infrared image with respect to a designed coordinate of the second region. The corrector performs coordinate correction with the calculated first or second correction value for the ultrasonic image of the inspection object.

19 Claims, 11 Drawing Sheets

DEFECT INSPECTION DEVICE

CROSS REFERENCE TO RELATED APPLICATIONS

This application is based upon and claims the benefit of priority from the prior Japanese Patent Application No. 2020-153258, filed on Sep. 11, 2020, the entire contents of which are incorporated herein by reference.

FIELD

Embodiments of the present invention relate to a defect inspection device.

BACKGROUND

A void defect in a wafer is inspected based on ultrasonic images obtained by scanning the wafer with ultrasonic waves radiated from an ultrasonic probe. However, it is difficult to improve the accuracy of inspection because coordinates of the ultrasonic images are deviated from designed coordinates on the wafer.

DETAILED DESCRIPTION

Figure 1:
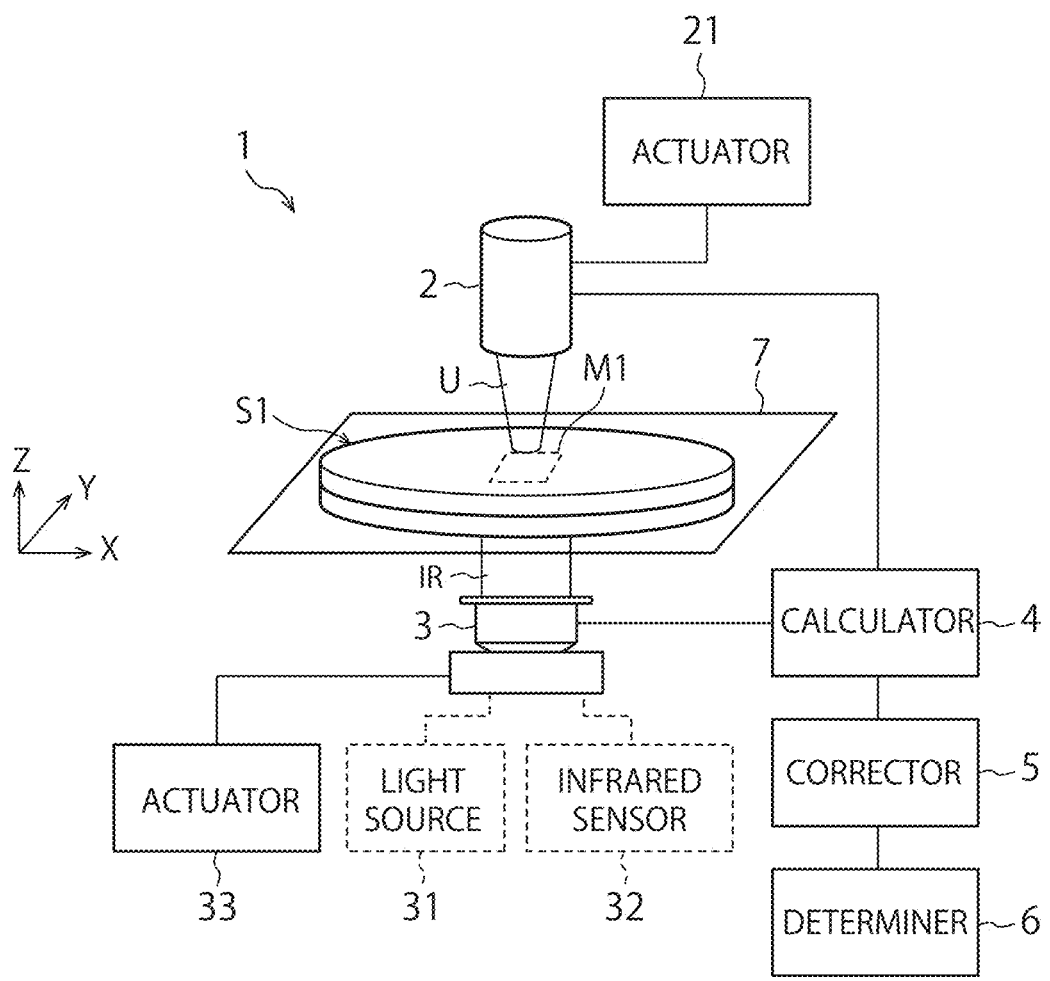
FIG. 1 is a diagram illustrating a defect inspection device according to a first embodiment.

A defect inspection device according to one embodiment comprises: an ultrasonic probe; an image acquirer; a calculator; and a corrector. The ultrasonic probe is configured to radiate ultrasonic waves toward an inspection object for which inspection of defects is performed or a simulated inspection object that simulates the inspection object, receive ultrasonic waves reflected by the inspection object or the simulated inspection object, and convert the received ultrasonic waves to an electric signal to acquire an ultrasonic image of the inspection object or the simulated inspection object. The image acquirer is configured to radiate infrared rays toward a first region of the simulated inspection object or a second region of the inspection object, receive infrared rays reflected by or transmitted through the first or second region, and convert the received infrared rays to an electric signal to acquire an infrared image including the first or second region. The calculator is configured to calculate a first correction value for correcting a coordinate deviation of the first region in the ultrasonic image and the infrared image with respect to a designed coordinate of the first region, or calculate a second correction value for correcting a coordinate deviation of the second region in the infrared image with respect to a designed coordinate of the second region. The corrector is configured to perform coordinate correction with the calculated first or second correction value for the ultrasonic image of the inspection object.

Embodiments of the present invention will now be explained in detail with reference to the accompanying drawings. In FIGS. 1 to 13, like or similar constituent elements are denoted by like reference characters and redundant explanations thereof are omitted.

First Embodiment

FIG. 1 is a diagram illustrating a defect inspection device 1 according to a first embodiment. As illustrated in FIG. 1, the defect inspection device 1 according to the first embodiment includes an ultrasonic probe 2, an infrared camera 3, a calculator 4, a corrector 5, and a determiner 6.

The ultrasonic probe 2 is arranged to face a reference bonded substrate S1 that simulates a bonded substrate obtained by bonding two semiconductor substrates to each other. In the example illustrated in FIG. 1, the ultrasonic probe 2 is arranged to face the top surface of the reference bonded substrate S1. Before inspection of a void defect that can be formed between the two semiconductor substrates of the bonded substrate, the ultrasonic probe 2 radiates ultrasonic waves (U in FIG. 1) toward the reference bonded substrate S1. The reference bonded substrate S1 is placed on a stage 7 that can move the reference bonded substrate S1 in the X and Y directions that are along a surface of the substrate S1. The stage 7 is driven by a driving source (not illustrated) such as a motor.

The reference bonded substrate S1 is two semiconductor substrates bonded to each other like the bonded substrate. A reference void mark M1 that simulates a void defect is formed between the two semiconductor substrates. The reference void mark M1 is a mark having coordinates that are known in the defect inspection device 1. The reference void mark M1 is different from its surrounding region in an ultrasonic reflectance and an infrared reflectance. The surrounding region may be a region formed by an oxide film or a nitride film.

The ultrasonic probe 2 receives the ultrasonic waves reflected by the reference bonded substrate S1 and converts them to an electric signal, thereby acquiring an ultrasonic image of the reference bonded substrate S1 including an ultrasonic image of the reference void mark M1. The ultrasonic probe 2 can be moved in the Z direction by an actuator 21. The ultrasonic probe 2 may be movable also in the X and Y directions by the actuator 21. The bonded substrate has a plurality of semiconductor structures (chips) having the same pattern before dicing. Each semiconductor structure is formed by photolithography using the same reticle. The semiconductor structures may be three-dimensional memory structures. In this case, one of the two semiconductor substrates constituting each of the bonded substrate and the reference bonded substrate S1 may be a substrate provided with three-dimensional memory cells, wires, insulating layers, and the like, and the other semiconductor substrate may be a substrate provided with transistors, wires, insulating layers, and the like.

The infrared camera 3 is arranged to face the reference bonded substrate S1 from the side opposite to the ultrasonic probe 2. In the example illustrated in FIG. 1, the infrared camera 3 is arranged to face the bottom surface of the reference bonded substrate S1. The infrared camera 3 includes a light source 31 and an infrared sensor 32. The infrared camera 3 radiates infrared rays (IR in FIG. 1) by the light source 31 toward the reference void mark M1 of the reference bonded substrate S1 from the side opposite to the ultrasonic probe 2. The infrared camera 3 receives the infrared rays reflected by the reference void mark M1 by the infrared sensor 32 and converts them to an electric signal, thereby acquiring an infrared image of the reference void mark M1. The infrared camera 3 can be moved in the Z direction by an actuator 33. The infrared camera 3 may be movable also in the X and Y directions by the actuator 33. The infrared sensor 32 may be arranged on the side opposite to the light source 31 across the reference bonded substrate S1. In this case, the infrared sensor 32 receives the infrared rays transmitted through the reference bonded substrate S1 and converts them to an electric signal, thereby acquiring the infrared image of the reference void mark M1.

The calculator 4 calculates a first correction value that corrects a deviation of a coordinate of a magnification component of the reference void mark M1 in the ultrasonic image and the infrared image with respect to a designed coordinate of the reference void mark M1.

After the first correction value is calculated, the ultrasonic probe 2 radiates ultrasonic waves toward the bonded substrate placed on the stage 7 in place of the reference bonded substrate S1 in order to inspect a void defect that can be formed between two semiconductor substrates of the bonded substrate. Radiation of the ultrasonic waves toward the bonded substrate is performed for the entire surface of the bonded substrate while the stage 7 is driven and the bonded substrate is moved. The ultrasonic probe 2 receives the ultrasonic waves reflected by the bonded substrate and converts them to an electric signal, thereby acquiring an ultrasonic image of the bonded substrate. The corrector 5 performs coordinate correction with the calculated first correction value for the acquired ultrasonic image of the bonded substrate.

The determiner 6 determines, based on the ultrasonic image of the bonded substrate for which coordinate correction with the first correction value has been performed, whether there is a defect common to the semiconductor structures (hereinafter, "common defect") which depends on a reticle pattern as a void defect in the bonded substrate.

The calculator 4, the corrector 5, and the determiner 6 may be configured by hardware such as a computer. The calculator 4, the corrector 5, and the determiner 6 may be partly configured by software.

Figure 2:
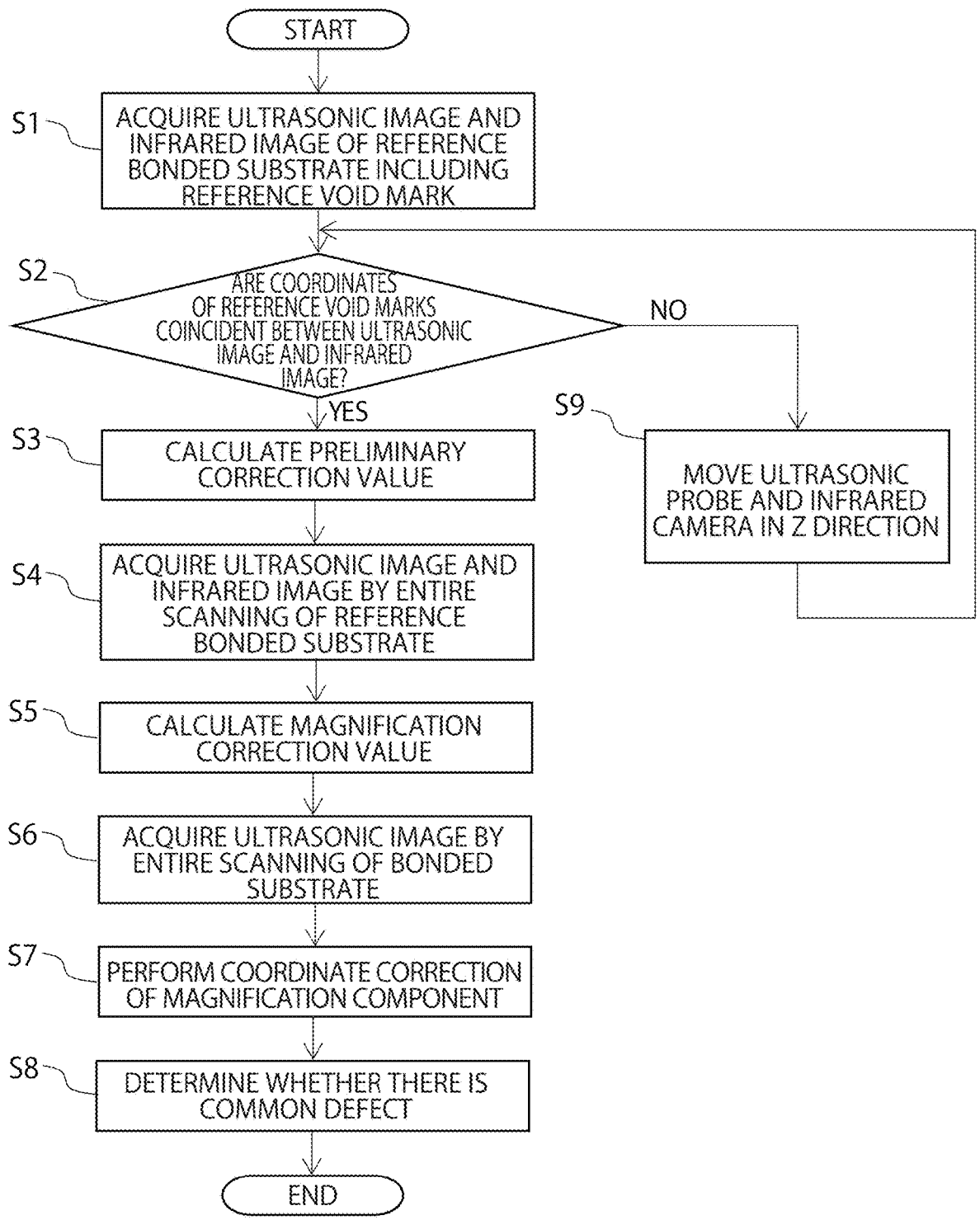
FIG. 2 is a flowchart illustrating an operation example of the defect inspection device according to the first embodiment.
Figure 3:
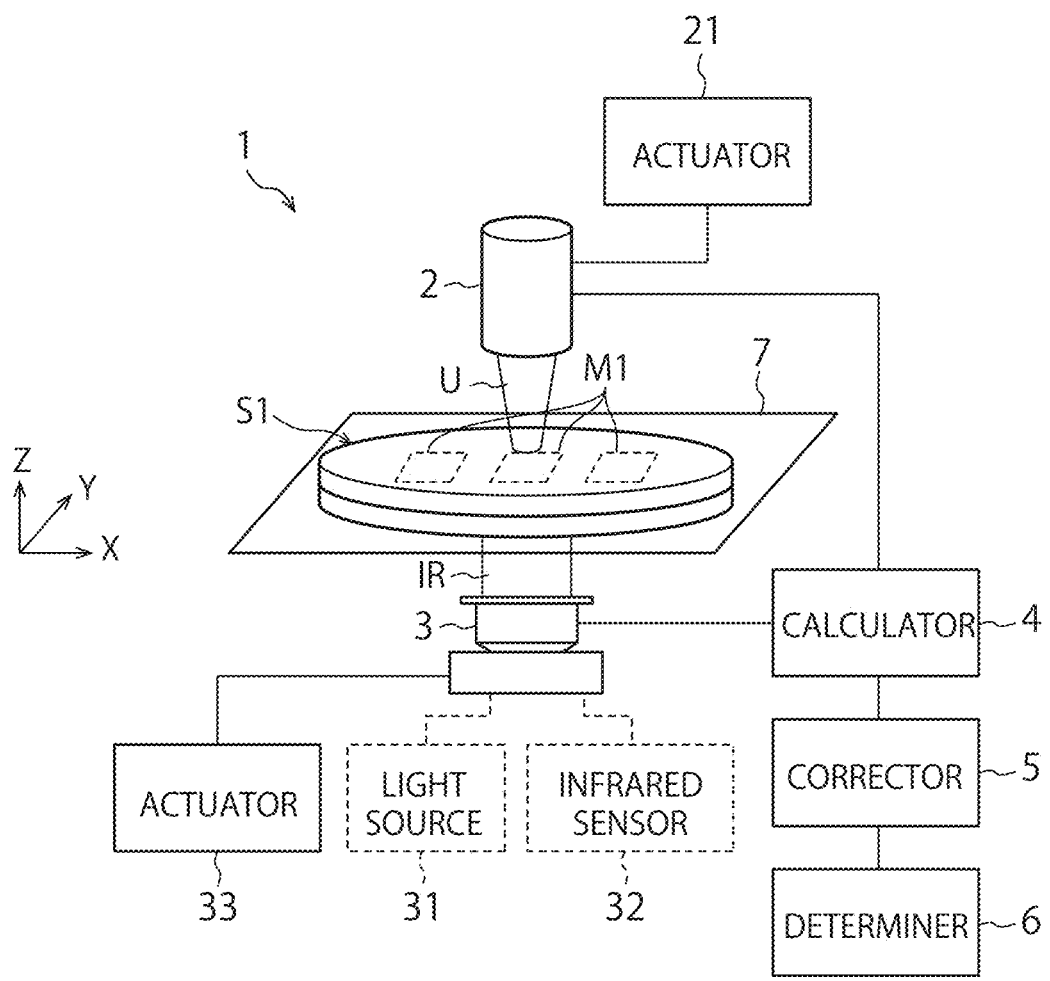
FIG. 3 is a diagram illustrating another operation example of the defect inspection device according to the first embodiment.

Next, an operation example of the defect inspection device 1 according to the first embodiment having the above-described configuration is described. FIG. 2 is a flowchart illustrating an operation example of the defect inspection device 1 according to the first embodiment. FIG. 3 is a diagram illustrating another operation example of the defect inspection device 1 according to the first embodiment.

First, as illustrated in FIG. 3, while the reference bonded substrate S1 with the plural reference void marks M1 formed therein is placed on the stage 7, the ultrasonic probe 2 radiates ultrasonic waves toward one of the reference void marks M1 from above, receives the ultrasonic waves reflected by the reference void mark M1, and converts them to an electric signal, thereby acquiring an ultrasonic image of the reference bonded substrate S1 including the reference void marks M1 (Step S1 in FIG. 2). Acquisition of the ultrasonic image of the reference bonded substrate S1 including the reference void marks M1 is performed for each reference void mark M1. Further, at this time, the infrared camera 3 radiates infrared rays toward one of the reference void marks M1 from below, receives the infrared rays reflected by the reference void mark M1, and converts them to an electric signal, thereby acquiring an infrared image of the reference bonded substrate S1 including the reference void marks M1 (Step S1 in FIG. 2). Acquisition of the infrared image of the reference bonded substrate S1 including the reference void marks M1 is performed for each reference void mark M1.

After the ultrasonic images and the infrared images are acquired, the calculator 4 determines, for each reference void mark M1, whether a coordinate of the reference void mark M1 in the ultrasonic image and a coordinate of the reference void mark M1 of the infrared image are coincident with each other by image analysis (Step S2).

If the coordinate of the reference void mark M1 in the ultrasonic image and the coordinate of the reference void mark M1 in the infrared image are coincident with each other (YES at Step S2), the corrector 5 obtains a deviation of a coordinate of a magnification component of the reference void mark M1 in the ultrasonic image and the infrared image with respect to a designed coordinate of the reference void mark M1 acquired beforehand, and then calculates a preliminary correction value that corrects the coordinate deviation of the magnification component (Step S3). The preliminary correction value is a correction value that does not consider a deviation of the coordinate of the reference void mark M1 in the ultrasonic image and the infrared image from the designed coordinate, caused by entire scanning of the reference bonded substrate S1 described later. The preliminary correction value may be an average value of preliminary correction values respectively corresponding to the plural reference void marks M1.

Figure 4:
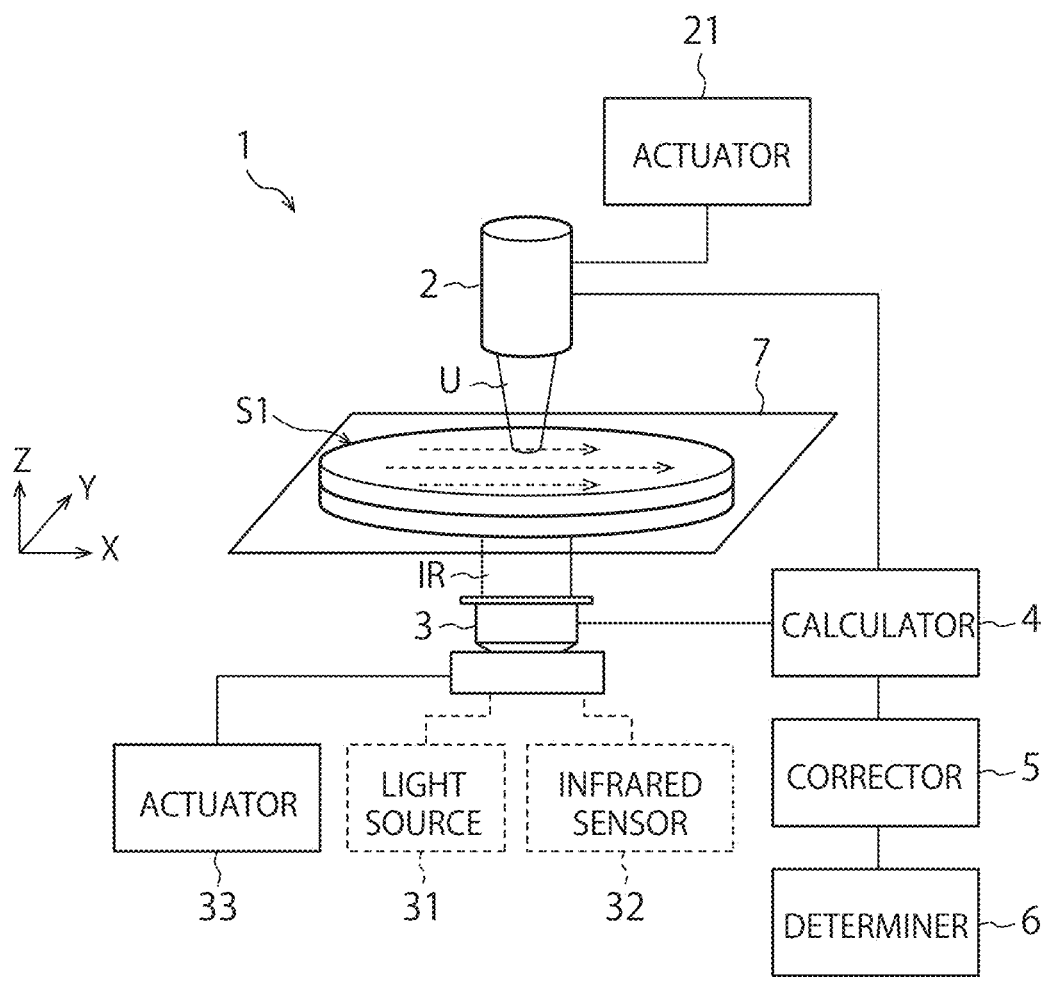
FIG. 4 is a diagram illustrating an operation example of the defect inspection device according to the first embodiment following FIG. 3.

FIG. 4 is a diagram illustrating an operation example of the defect inspection device 1 according to the first embodiment following FIG. 3. After the preliminary correction value is calculated, the calculator 4 causes the stage 7 to be driven in such a manner that the reference bonded substrate S1 is entirely scanned with the ultrasonic probe 2 and the infrared camera 3 as illustrated in FIG. 4, thereby acquiring an ultrasonic image and an infrared image (Step S4 in FIG. 2). In FIG. 4, broken arrows indicate the direction of scanning in which the reference bonded substrate S1 is scanned one line at a time.

After the ultrasonic image and the infrared image are acquired by the entire scanning of the reference bonded substrate S1, the calculator 4 obtains a deviation between a coordinate of the reference void mark M1 in the ultrasonic image and the infrared image acquired by the entire scanning and a coordinate of the reference void mark M1 corrected with the preliminary correction value, and calculates a magnification correction value that corrects the deviation (Step S5). The magnification correction value is a correction value that considers the deviation of the coordinate of the reference void mark M1 in the ultrasonic image and the infrared image from the designed coordinate, caused by the entire scanning of the reference bonded substrate S1.

Figure 5:
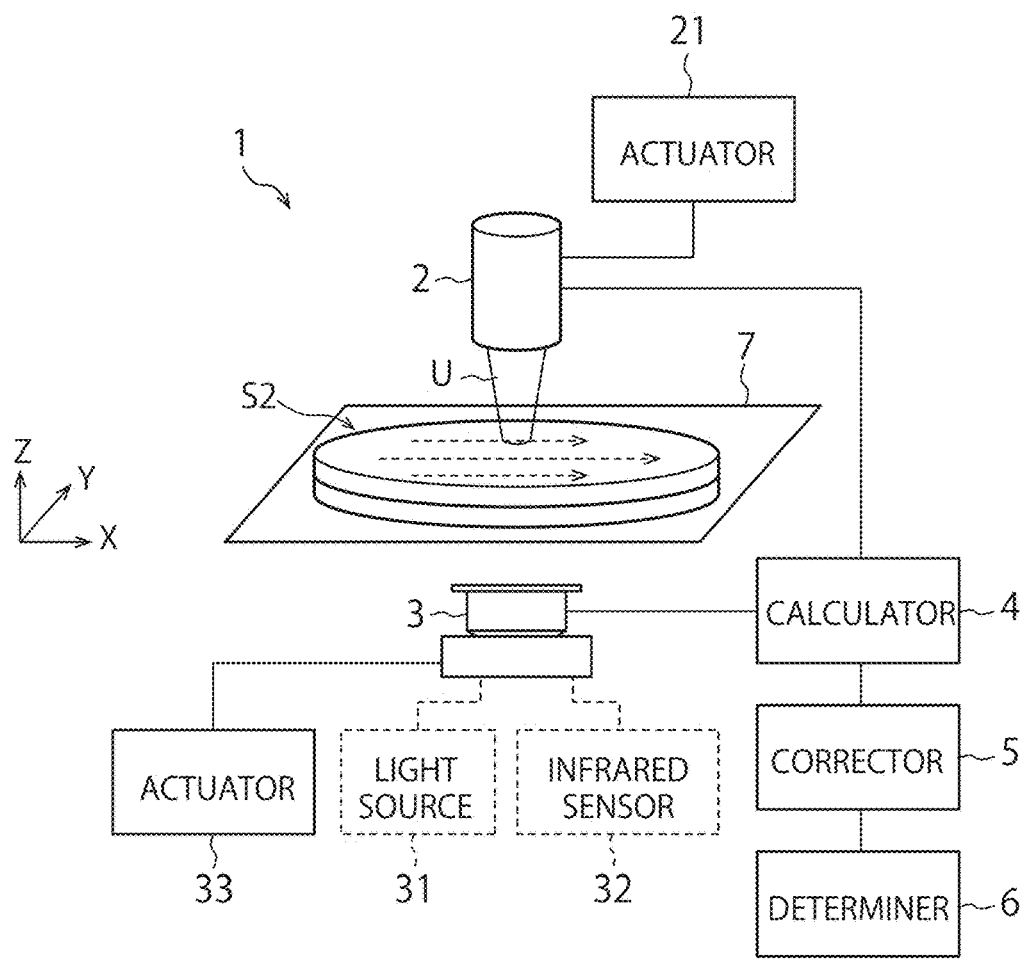
FIG. 5 is a diagram illustrating an operation example of the defect inspection device according to the first embodiment following FIG. 4.

FIG. 5 is a diagram illustrating an operation example of the defect inspection device 1 according to the first embodiment following FIG. 4. After the magnification correction value is calculated, a bonded substrate S2 is placed on the stage 7 in place of the reference bonded substrate S1 in order to inspect whether there is a void defect that can be formed between two semiconductor substrates of the bonded substrate S2 as illustrated in FIG. 5. While the bonded substrate S2 is placed on the stage 7, the determiner 6 causes the stage 7 to be driven in such a manner that the bonded substrate S2 is entirely scanned with the ultrasonic probe 2, thereby acquiring an ultrasonic image of the bonded substrate S2 (Step S6 in FIG. 2). In FIG. 5, broken arrows indicate the direction of scanning in which the bonded substrate S2 is scanned one line at a time.

Figure 6:
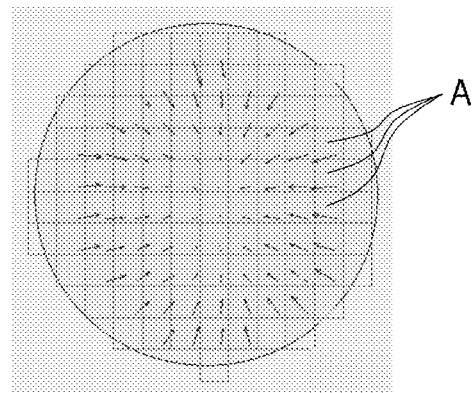
FIG. 6 is a diagram illustrating an operation example of the defect inspection device according to the first embodiment following FIG. 5.

FIG. 6 is a diagram illustrating an operation example of the defect inspection device 1 according to the first embodiment following FIG. 5. FIG. 6 illustrates an ultrasonic image acquired by the entirely scanning of the bonded substrate S2. Each of rectangular regions A in FIG. 6 corresponds to one semiconductor structure (that is, one shot). After the ultrasonic image of the bonded substrate S2 by the entire scanning is acquired, the corrector 5 performs coordinate correction of magnification component with the magnification correction value for the acquired ultrasonic image of the bonded substrate S2 (Step S7 in FIG. 2). A plurality of arrows in FIG. 6 indicate that a coordinate of a magnification component of each point in the ultrasonic image of the bonded substrate S2 is changed from a coordinate before correction to a coordinate after correction. The coordinate correction of magnification component may be performed for a plurality of predetermined representative coordinates in the ultrasonic image of the bonded substrate S2. In this case, the representative coordinates may be coordinates of voids detected in the ultrasonic image of the bonded substrate S2 by image analysis.

After coordinate correction is performed for the ultrasonic image of the bonded substrate S2, the determiner 6 determines whether there is a common defect in the ultrasonic image based on the ultrasonic image for which coordinate correction has been performed (Step S8).

Meanwhile, if the coordinate of the reference void mark M1 in the ultrasonic image and the coordinate of the reference void mark M1 in the infrared image are not coincident with each other (NO at Step S2), the actuator 21 of the ultrasonic probe 2 and the actuator 33 of the infrared camera 3 move the ultrasonic probe 2 and the infrared camera 3 in the Z direction by predetermined moving amounts (Step S9). Thereafter, the calculator 4 repeats determination whether the coordinate of the reference void mark M1 in the ultrasonic image and the coordinate of the reference void mark M1 in the infrared image are coincident with each other (Step S2).

Figure 7A:
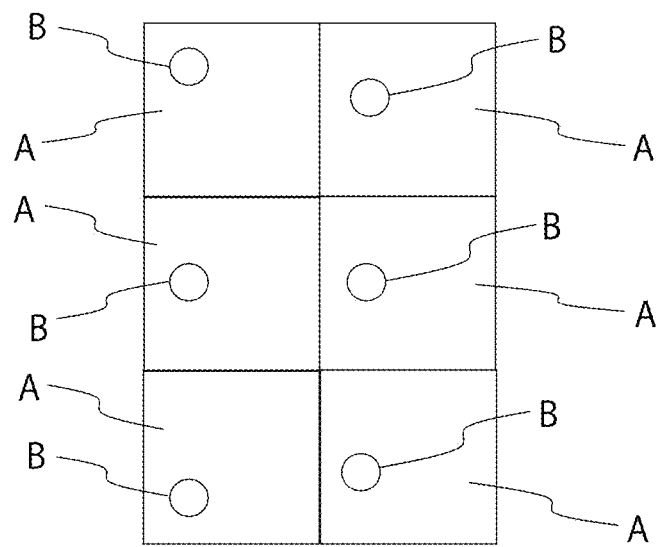
FIG. 7A is a diagram illustrating a common defect detected by a defect inspection device according to a comparative example.
Figure 7B:
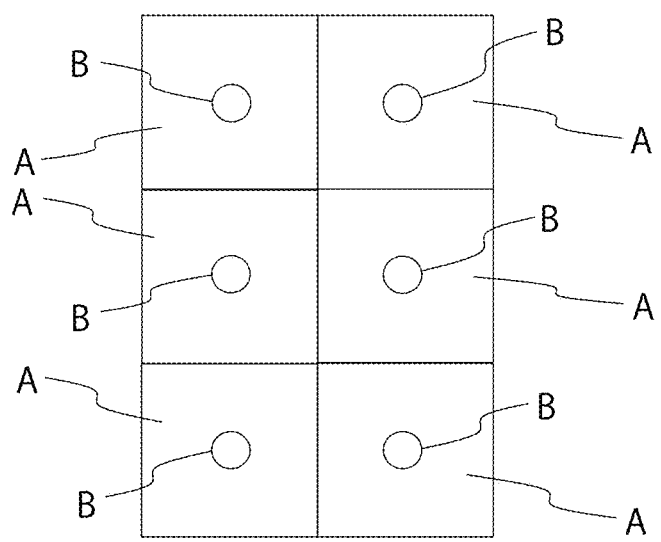
FIG. 7B is a diagram illustrating a common defect detected by the defect inspection device according to the first embodiment.

FIG. 7A is a diagram illustrating a common defect detected by a defect inspection device according to a comparative example. FIG. 7B is a diagram illustrating a common defect detected by the defect inspection device 1 according to the first embodiment. With regard to a void in an ultrasonic image, there is a coordinate deviation of a magnification component unique to the defect inspection device 1. In a case where the coordinate deviation of the magnification component is not corrected, even if a common defect B (a void defect) that is common to semiconductor structures A is present in the bonded substrate S2, the common defect B appears at a different position in the individual semiconductor structures A because of the coordinate deviation of the magnification component as illustrated in FIG. 7A. Therefore, the defect B is determined as not being a common defect. Meanwhile, according to the first embodiment, it is possible to correct a coordinate deviation of a magnification component by calculating a magnification correction value for correcting the coordinate deviation of the magnification component using an ultrasonic image and an infrared image of the reference bonded substrate S1 and performing coordinate correction for an ultrasonic image of the bonded substrate S2 with the calculated magnification correction value. Accordingly, the common defect B can be located at the same position in the individual semiconductor structures A as illustrated in FIG. 7B, and thus it is possible to accurately determine that the common defect B is present.

Further, the coordinate deviation of the magnification component depends on the defect inspection device 1, not on each bonded substrate S2. Therefore, once the magnification correction value is calculated, the same magnification correction value can be applied to a plurality of the bonded substrates S2 as a common correction value.

As described above, according to the first embodiment, it is possible to improve the accuracy of inspection of defects in the bonded substrate S2.

Second Embodiment

Figure 8:
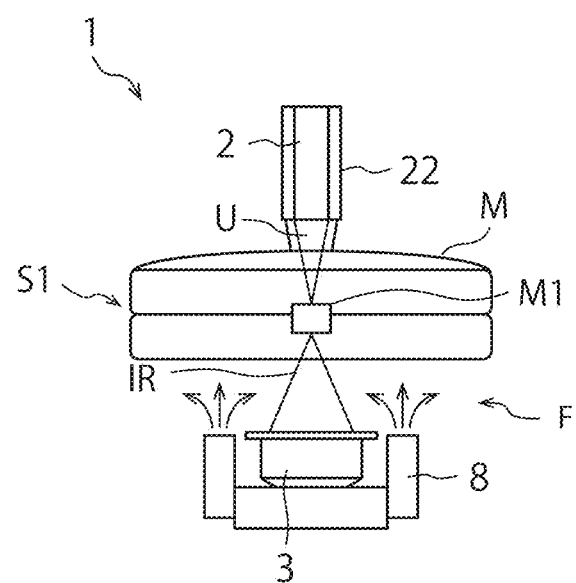
FIG. 8 is a diagram illustrating a defect inspection device according to a second embodiment.

Next, a second embodiment is described in which a contact medium and a dry fluid are supplied to the reference bonded substrate S1. FIG. 8 is a diagram illustrating the defect inspection device 1 according to the second embodiment.

As illustrated in FIG. 8, the defect inspection device 1 according to the second embodiment includes a nozzle 22 that is arranged to surround the ultrasonic probe 2 and supplies a contact medium (M in FIG. 8) to the top surface of the reference bonded substrate S1. The contact medium is a liquid that is supplied in order to prevent formation of an air layer preventing propagation of ultrasonic waves between the ultrasonic probe 2 and the reference bonded substrate S1. The contact medium may be water. The contact medium may be also supplied to the bonded substrate S2.

Further, the defect inspection device 1 includes a supply device 8 that supplies a dry fluid (F in FIG. 8) to the bottom surface of the reference bonded substrate S1, in a surrounding region of the infrared camera 3 as illustrated in FIG. 8. The dry fluid may be air or nitrogen. The dry fluid may be also supplied to the bonded substrate S2.

According to the second embodiment, it is possible to improve propagation efficiency of ultrasonic waves by a contact medium and is also possible to prevent absorption of infrared rays by the contact medium adhering to the bottom surface of the reference bonded substrate S1, by a dry fluid. Accordingly, it is possible to further improve the accuracy of inspection of defects.

Third Embodiment

Figure 9:
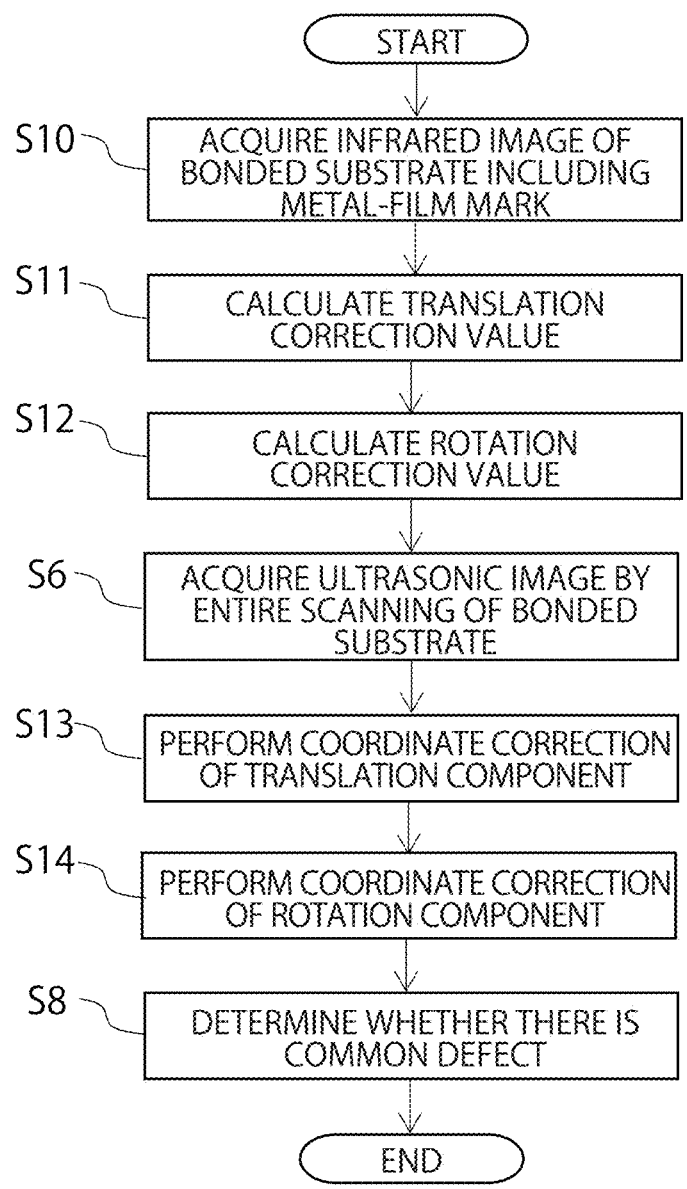
FIG. 9 is a flowchart illustrating an operation example of a defect inspection device according to a third embodiment.
Figure 10:
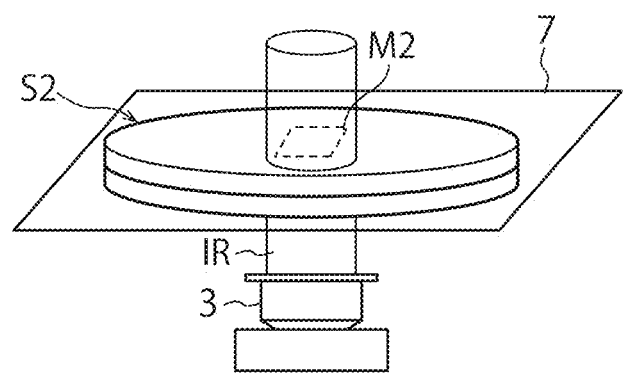
FIG. 10 is a diagram illustrating an operation example of the defect inspection device according to the third embodiment.

Next, there is described a third embodiment in which a coordinate deviation of a translation component and a coordinate deviation of a rotation component of a bonded substrate are corrected. FIG. 9 is a flowchart illustrating an operation example of the defect inspection device 1 according to the third embodiment. FIG. 10 is a diagram illustrating an operation example of the defect inspection device 1 according to the third embodiment. Since the defect inspection device 1 according to the third embodiment has a configuration similar to that of the first embodiment, descriptions are given as reference characters common to those in the first embodiment are used.

First, as illustrated in FIG. 10, while the bonded substrate S2 having a metal-film mark M2 is placed on the stage 7, the infrared camera 3 radiates infrared rays toward the metal-film mark M2 from below, receives the infrared rays reflected by the metal-film mark M2, and converts them to an electric signal, thereby acquiring an infrared image of the bonded substrate S2 including the metal-film mark M2 (Step S10 in FIG. 9). The metal-film mark M2 is a mark having coordinates that are known in the defect inspection device 1. The metal-film mark M2 is different from its surrounding region in an infrared reflectance. The metal-film mark M2 may be, for example, a Cu film or a W film. The surrounding region may be a film of oxide such as SiO or $SiO_2$ or a film of nitride such as SiN.

After the infrared image is acquired, the calculator 4 obtains a deviation of translation component between a coordinate of the metal-film mark M2 in the infrared image and a designed coordinate of the metal-film mark M2 by image analysis, and calculates a translation correction value that corrects the deviation of translation component (Step S11).

Further, the calculator 4 obtains a deviation of rotation component between the coordinate of the metal-film mark M2 in the infrared image and the designed coordinate of the metal-film mark M2 by image analysis, and calculates a rotation correction value that corrects the deviation of rotation component (Step S12). The order of Steps S11 and S12 may be changed, or both the steps may be performed at the same time.

As with the case illustrated in FIG. 5, the determiner 6 causes the stage 7 to be driven in such a manner that the bonded substrate S2 is entirely scanned with the ultrasonic probe 2, thereby acquiring an ultrasonic image of the bonded substrate S2 (Step S6).

Figure 11:
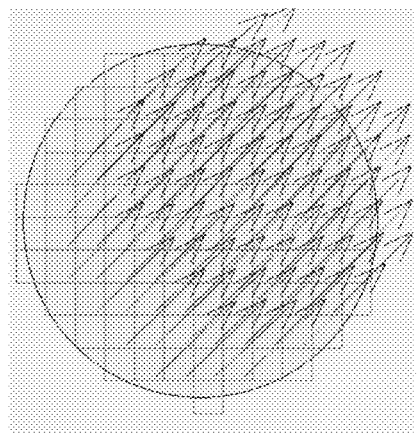
FIG. 11 is a diagram illustrating an operation example of the defect inspection device according to the third embodiment following FIG. 10.

FIG. 11 is a diagram illustrating an operation example of the defect inspection device 1 according to the third embodiment following FIG. 10. After the ultrasonic image of the bonded substrate S2 by the entire scanning is acquired, the corrector 5 performs coordinate correction of translation component with the translation correction value for the acquired ultrasonic image of the bonded substrate S2 as illustrated in FIG. 11 (Step S13 in FIG. 9). A plurality of arrows in FIG. 11 indicate that a coordinate of a translation component of each point in the ultrasonic image of the bonded substrate S2 is changed from a coordinate before correction to a coordinate after correction. The coordinate correction of translation component may be performed for a plurality of predetermined representative coordinates in the ultrasonic image of the bonded substrate S2. In this case, the representative coordinates may be coordinates of voids detected in the ultrasonic image of the bonded substrate S2 by image analysis.

Figure 12:
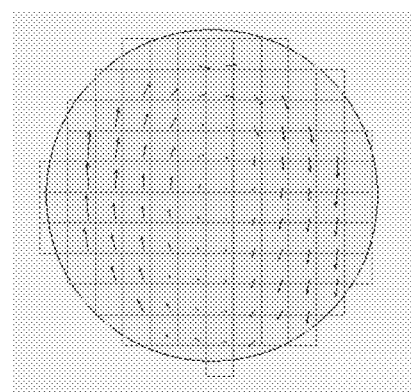
FIG. 12 is a diagram illustrating an operation example of the defect inspection device according to the third embodiment following FIG. 11.

FIG. 12 is a diagram illustrating an operation example of the defect inspection device 1 according to the third embodiment following FIG. 11. After the coordinate correction of translation component is performed, the corrector 5 performs coordinate correction of rotation component with the rotation correction value for the ultrasonic image of the bonded substrate S2 as illustrated in FIG. 12 (Step S14 in FIG. 9). A plurality of arrows in FIG. 12 indicate that a coordinate of a rotation component of each point in the ultrasonic image of the bonded substrate S2 is changed from a coordinate before correction to a coordinate after correction. The coordinate correction of rotation component may be performed for a plurality of predetermined representative coordinates in the ultrasonic image of the bonded substrate S2. In this case, the representative coordinates may be coordinates of voids detected in the ultrasonic image of the bonded substrate S2 by image analysis.

After coordinate correction is performed for the ultrasonic image of the bonded substrate S2, the determiner 6 determines whether there is a common defect in the ultrasonic image based on the ultrasonic image for which coordinate correction has been performed (Step S8).

Here, the bonded substrate S2 is placed on the stage 7 by a robot arm after the position of a notch formed in the bonded substrate S2 is detected by a notch aligner and the position of the notch in a rotation direction is adjusted in such a manner that the detected notch faces in a predetermined direction. At this time, a coordinate deviation of a rotation component is generated in the bonded substrate S2 because of a variation of the position of the notch in each bonded substrate S2. Further, a coordinate deviation of a translation component is generated in the bonded substrate S2 because of a variation of a transport position of the bonded substrate S2 on the stage 7 by the robot arm. These deviations are unique to each bonded substrate 2. In a case where the coordinate deviations of the translation component and the rotation component are not corrected, a void defect appears at a different position in the individual semiconductor structures A because of the coordinate deviations of the translation component and the rotation component even if there is a common defect in the bonded substrate S2. Therefore, the defect is determined as not being a common defect. Meanwhile, according to the third embodiment, it is possible to correct the deviations of the translation component and the rotation component by calculating correction values for correcting the deviations of the translation component and the rotation component using an infrared image of the bonded substrate S2 and performing coordinate correction for an ultrasonic image of the bonded substrate S2 with the calculated correction values. Accordingly, a common defect can be located at the same position in the individual semiconductor structures A, and thus it is possible to accurately determine that there is a common defect.

As described above, according to the third embodiment, it is possible to improve the accuracy of inspection of defects in the bonded substrate S2.

Fourth Embodiment

Figure 13:
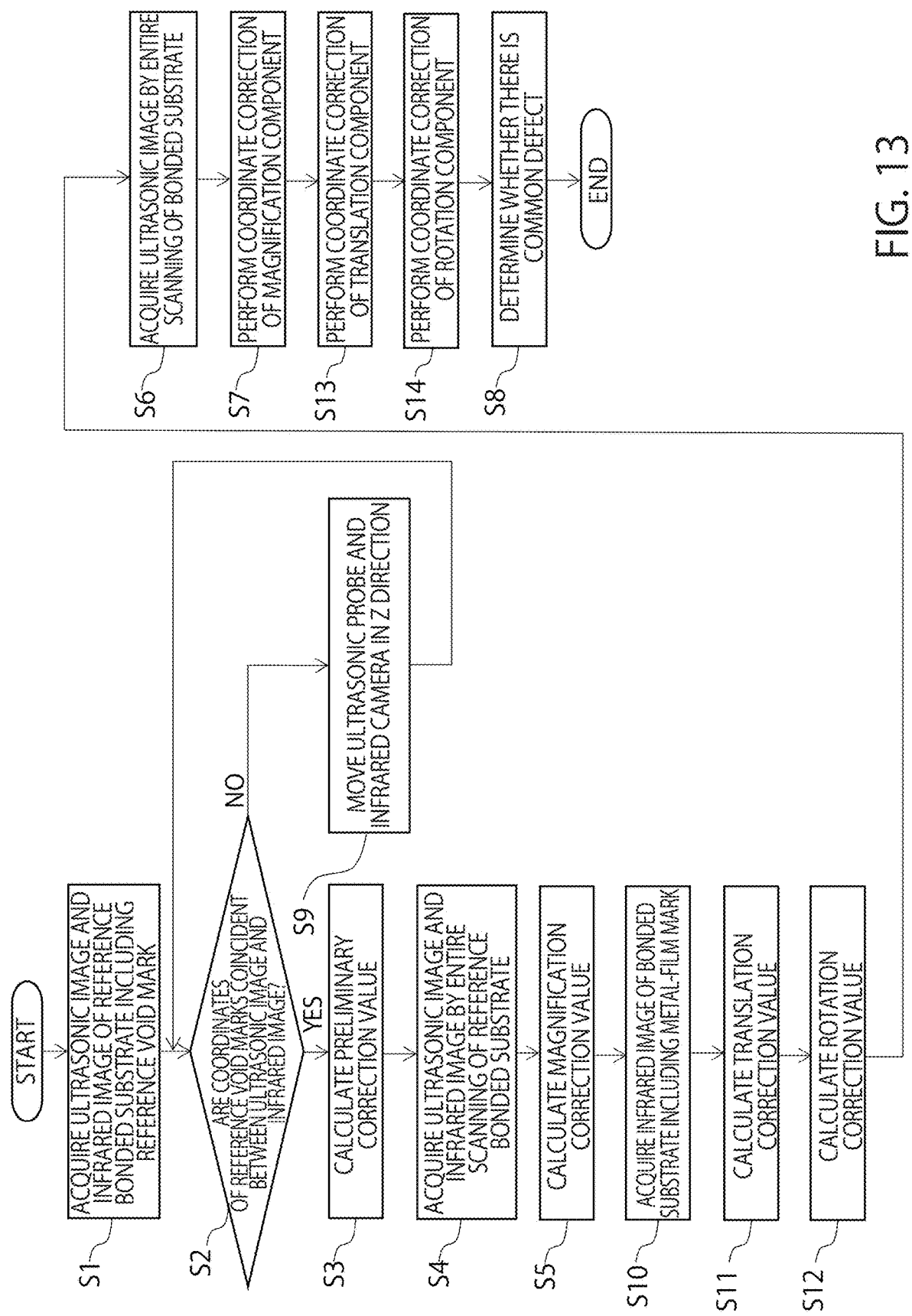
FIG. 13 is a flowchart illustrating an operation example of a defect inspection device according to a fourth embodiment.

Next, a fourth embodiment that corrects coordinate deviations of a magnification component, a translation component, and a rotation component of the bonded substrate S2 is described. FIG. 13 is a flowchart illustrating an operation example of the defect inspection device 1 according to the fourth embodiment.

As illustrated in FIG. 13, the operation example of the defect inspection device 1 according to the fourth embodiment is a combination of the operation example of the defect inspection device 1 according to the first embodiment and the operation example of the defect inspection device 1 according to the third embodiment.

That is, in the fourth embodiment, a magnification calculation value is calculated based on the reference void mark M1 in an ultrasonic image and an infrared image of the reference bonded substrate S1, and then a translation correction value and a rotation correction value are calculated based on the metal-film mark M2 in an infrared image of the bonded substrate S2, and thereafter coordinate correction is performed for an ultrasonic image of the bonded substrate S2 using the magnification, translation, and rotation correction values thus calculated. Thereafter, it is determined whether a common defect is present based on the ultrasonic image in which coordinates of a magnification component, a translation component, and a rotation component have been corrected.

According to the fourth embodiment, it is possible to further improve the accuracy of inspection of defects in the bonded substrate S2 by correcting coordinate deviations of magnification, translation, and rotation components.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A defect inspection device comprising:
an ultrasonic probe configured to radiate ultrasonic waves toward an inspection object for which inspection of a defect is performed or a simulated inspection object that simulates the inspection object, receive ultrasonic waves reflected by the inspection object or the simulated inspection object, and convert the received ultrasonic waves to an electric signal to acquire an ultrasonic image of the inspection object or the simulated inspection object;
an image acquirer configured to radiate infrared rays toward a first region of the simulated inspection object or a second region of the inspection object, receive infrared rays reflected by or transmitted through the first or second region, and convert the received infrared rays to an electric signal to acquire an infrared image including the first or second region;
a calculator configured to calculate a first correction value for correcting a coordinate deviation of the first region in the ultrasonic image and the infrared image with respect to a designed coordinate of the first region, or calculate a second correction value for correcting a coordinate deviation of the second region in the infrared image with respect to a designed coordinate of the second region; and
a corrector configured to perform coordinate correction with the calculated first or second correction value for the ultrasonic image of the inspection object.

2. The device of claim 1, wherein the first region and the second region each have a different reflectance from its surrounding region.

3. The device of claim 2, wherein the defect is a void defect.

4. The device of claim 3, wherein the first region is a void mark that simulates the void defect.

5. The device of claim 2, wherein the second region is a region formed by a metal film.

6. The device of claim 2, wherein the surrounding region is a region formed by an oxide film or a nitride film.

7. The device of claim 1, wherein the coordinate deviation of the first region in the ultrasonic image and the infrared image with respect to the designed coordinate of the first region is a deviation of a magnification component.

8. The device of claim 1, wherein the coordinate deviation of the second region in the infrared image with respect to the designed coordinate of the second region includes a deviation of a translation component.

9. The device of claim 1, wherein the coordinate deviation of the second region in the infrared image with respect to the designed coordinate of the second region includes a deviation of a rotation component.

10. The device of claim 1, further comprising a first supply device configured to supply a contact medium to a surface of the simulated inspection object on a side close to the ultrasonic probe.

11. The device of claim 1, further comprising a second supply device configured to supply a dry fluid to a surface of the simulated inspection object on a light-source side.

12. The device of claim 1, wherein
the inspection object has a plurality of semiconductor structures that are same as each other, and
the defect inspection device further comprises a determiner configured to determine whether there is a defect common to the semiconductor structures based on the ultrasonic image of the inspection object for which the coordinate correction has been performed.

13. The device of claim 1, wherein the first correction value is a correction value common to a plurality of inspection objects.

14. The device of claim 1, wherein the second correction value is a correction value unique to each inspection object.

15. The device of claim 1, wherein the inspection object is a bonded substrate obtained by bonding two semiconductor substrates to each other.

16. The device of claim 1, wherein
the image acquirer includes
a light source arranged on a side of the inspection object or the simulated inspection object opposite to the ultrasonic probe and configured to radiate infrared rays toward the first or second region, and
an infrared sensor configured to acquire the infrared image.

17. A defect inspection method comprising:
radiating ultrasonic waves toward a first region of a simulated inspection object that simulates an inspection object for which inspection of a defect is performed, receiving ultrasonic waves reflected by the first region, and converting the received ultrasonic waves to an electric signal to acquire an ultrasonic image including the first region;
radiating infrared rays toward the first region from a side opposite to the ultrasonic waves, receiving infrared rays reflected by or transmitted through the first region, and converting the received infrared rays to an electric signal to acquire an infrared image including the first region;
calculating a first correction value for correcting a coordinate deviation of the first region in the ultrasonic image and the infrared image with respect to a designed coordinate of the first region;
radiating ultrasonic waves toward the inspection object, receiving the ultrasonic waves reflected by the inspection object, and converting the received ultrasonic waves to an electric signal to acquire an ultrasonic image of the inspection object; and performing coordinate correction with the calculated first correction value for the ultrasonic image of the inspection object.

18. The method of claim 17, further comprising:

radiating infrared rays toward a second region of the inspection object after the first correction value is calculated;

receiving the infrared rays reflected by or transmitted through the second region and converting the received infrared rays to an electric signal to acquire an infrared image including the second region;

calculating a second correction value for correcting a coordinate deviation of the second region in the infrared image with respect to a designed coordinate of the second region; and performing coordinate correction with the calculated second correction value for the ultrasonic image of the inspection object.

19. A defect inspection method comprising:

radiating infrared rays toward a second region of an inspection object for which inspection of a defect is performed;

receiving infrared rays reflected by or transmitted through the second region and converting the received infrared rays to an electric signal to acquire an infrared image including the second region;

calculating a second correction value for correcting a coordinate deviation of the second region in the infrared image with respect to a designed coordinate of the second region;

radiating ultrasonic waves toward the inspection object from a side opposite to the infrared rays, receiving ultrasonic waves reflected by the inspection object, and converting the received ultrasonic waves to an electric signal to acquire an ultrasonic image of the inspection object; and performing coordinate correction with the calculated second correction value for the ultrasonic image of the inspection object.

* * * * *